No. 705,600. Patented July 29, 1902.
J. A. McLAUGHLIN.
VEHICLE AXLE.
(Application filed May 26, 1902.)
(No Model.)
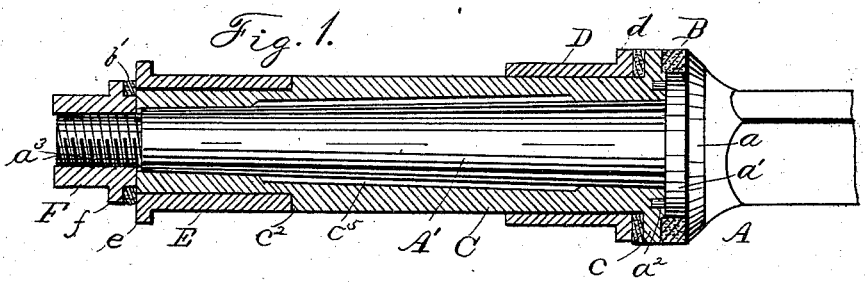
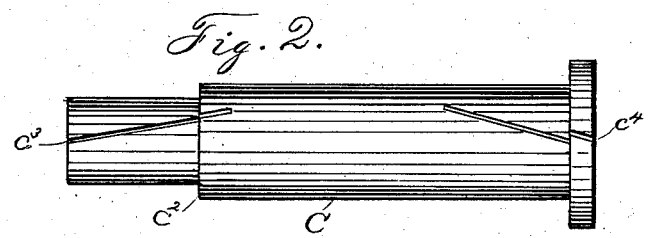
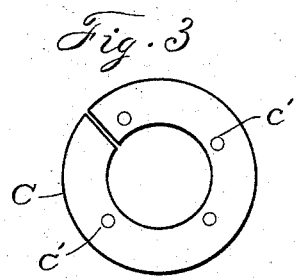 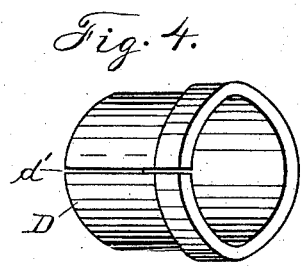
WITNESSES:
INVENTOR
James A. McLaughlin
BY
ATTORNEY

UNITED STATES PATENT OFFICE.

JAMES A. McLAUGHLIN, OF STATESBORO, GEORGIA, ASSIGNOR OF TWO-THIRDS TO LEONARD CARTER AND WALTER P. DOROUGH, OF VALDOSTA, GEORGIA.

VEHICLE-AXLE.

SPECIFICATION forming part of Letters Patent No. 705,600, dated July 29, 1902.

Application filed May 26, 1902. Serial No. 109,088. (No model.)

*To all whom it may concern:*

Be it known that I, JAMES A. MCLAUGHLIN, a citizen of the United States, residing at Statesboro, in the county of Bulloch and State of Georgia, have invented certain new and useful Improvements in Vehicle-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to vehicle-axles in which a sleeve is fitted upon the spindle and has bearing-surfaces for the bushings which are seated in the hub.

It consists, first, in means for securing the sleeve tightly upon the spindle; second, in an oil-retainer and dust-guard, and, third, in a provision for distributing the lubricant upon the bearing-surfaces.

The accompanying drawings illustrate the invention, in which—

Figure 1 is a side view, partly in section; Fig. 2, a side of the sleeve; Fig. 3, a plan of the inner end of the sleeve, and Fig. 4 a detail of a bushing.

Like letters denote corresponding parts in the several views.

A indicates a vehicle-axle, and A' the spindle of the axle, which is preferably made tapering toward the point $a^3$, which is threaded to engage a nut F.

$a$ is a fixed collar at the base of the spindle, and $a'$ is an extension of the collar $a$ and of a smaller diameter, on whose periphery is a seat for a washer B, which serves as an oil-retainer and dust-guard. One or more cogs or pins $a^2$ on the extension $a'$ projects toward the spindle-point.

C is a sleeve adapted to fit snugly upon the spindle and has a fixed collar $c$ at its base end and a shoulder $c^2$, formed by an abrupt reduction in circumference of its outer portion. One or more holes $c'$ in the face of the collar $c$ engages the pin $a^2$ and prevents rotation of the sleeve. The collar $c$ sets up closely against the washer B and the extension $a'$. Longitudinal oblique slits $c^3$ $c^4$ are cut slantingly through the sleeve at each end, which allows slight spreading of the sleeve and a tight hold when driven on the spindle. The slits also communicate with and act as oil-ducts from the oil-chamber $c^5$ in the sleeve. Both the slant and the obliquity of the slits $c^3$ $c^4$ are in the direction of the revolution of the hub.

D is a bushing adapted to fit revolubly on the inner end of the sleeve and over the slit $a^4$. It has a collar $d$, between which and the collar $c$ of the sleeve is interposed the washer $b$. At the outer end of the sleeve is another bushing E, having a collar $e$, seated over the slit $c^3$ and against the shoulder $c^2$. The bushings D and E are split longitudinally, as at $d'$, for diametrical adjustment. These bushings are fixed in the hub of the wheel and revolve with it upon the sleeve.

The nut F has a collar $f$ far enough from its inner end to admit a washer $b'$ between its said collar $f$ and the collar $e$ of the bushing E.

When the wheel is put on, the nut F is set tightly up against the sleeve, which brings the washer $b'$ against the bushing E and binds all the fixed parts tightly together, but leaves the bushings free to revolve freely upon the sleeve.

What I claim is—

1. In a vehicle-axle a collar at the base of the spindle, a pin thereon, a sleeve adapted to rest against said collar, and a hole in said sleeve to engage said pin for the purpose specified.

2. In a vehicle-axle a sleeve having oblique, slanting, terminal slits, extending inwardly, in the direction of the revolution of the hub, and into the oil-chamber, for the purposes specified.

3. In a vehicle-axle a collar at the base of the spindle, an extension on said collar of reduced diameter, a sleeve resting against said extension, a washer on said extension, a pin on the collar at the base of the spindle, a hole in the sleeve to engage said pin, an oil-chamber in said sleeve and slits in the ends of the sleeve to enter said chamber substantially as herein set forth.

In testimony whereof I affix my signature in presence of two witnesses.

JAMES A. McLAUGHLIN.

Witnesses:
E. B. SUMMERLIN,
S. L. MOORE.